(12) United States Patent
Maeda et al.

(10) Patent No.: US 10,290,837 B2
(45) Date of Patent: May 14, 2019

(54) PACKAGING MATERIAL FOR POWER STORAGE DEVICE

(71) Applicant: TOPPAN PRINTING CO., LTD., Tokyo (JP)

(72) Inventors: Hideyuki Maeda, Tokyo (JP); Yuki Muroi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 120 days.

(21) Appl. No.: 15/641,788

(22) Filed: Jul. 5, 2017

(65) Prior Publication Data

US 2017/0301890 A1    Oct. 19, 2017

Related U.S. Application Data

(63) Continuation of application No. PCT/JP2015/086040, filed on Dec. 24, 2015.

(30) Foreign Application Priority Data

Jan. 6, 2015   (JP) .................................. 2015-000908
May 13, 2015   (JP) .................................. 2015-098297
Nov. 9, 2015   (JP) .................................. 2015-219449

(51) Int. Cl.
   *H01M 2/02*   (2006.01)
(52) U.S. Cl.
   CPC ..................................... *H01M 2/02* (2013.01)
(58) Field of Classification Search
   CPC ............................. H01M 2/02; H01M 2/0202
   See application file for complete search history.

(56) References Cited

U.S. PATENT DOCUMENTS

2014/0251426 A1*   9/2014   Bando .................... C08K 3/346
                                                                  136/256

FOREIGN PATENT DOCUMENTS

| JP | 2000-067823 A | 3/2000 |
| JP | 2001-301090 A | 10/2001 |
| JP | 3567230 B2 | 9/2004 |
| JP | 2005-297448 A | 10/2005 |
| JP | 2012-033394 A | 2/2012 |
| JP | 2012-238515 A | 12/2012 |
| WO | WO-2011/078321 A1 | 6/2011 |
| WO | WO-2013/168731 A1 | 11/2013 |

OTHER PUBLICATIONS

International Search Report for International Patent Application No. PCT/JP2015/086040 dated Mar. 29, 2016.

* cited by examiner

*Primary Examiner* — Cynthia K Walls
(74) *Attorney, Agent, or Firm* — Foley & Lardner LLP (57) ABSTRACT

A packaging material for a power storage device, comprising: a coating layer disposed directly on a first surface of a metal foil or disposed via a first corrosion protection layer; and a second corrosion protection layer, a sealant adhesive layer, and a sealant layer disposed in this sequence on a second surface of the metal foil, wherein the coating layer is produced from an aromatic polyimide resin made of a tetracarboxylic dianhydride or derivatives thereof and a diamine or derivatives thereof, and wherein the coating layer has a tensile elongation in a tensile test (in compliance with JIS K7127, JIS K7127 specimen type 5, tensile rate 50 mm/min) is not less than 20% in an MD direction and a TD direction.

9 Claims, 2 Drawing Sheets

PACKAGING MATERIAL FOR POWER STORAGE DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/086040, filed on Dec. 24, 2015, which is based upon and claims the benefit of priority of Japanese Patent Application No. 2015-000908, filed on Jan. 6, 2015; Japanese Patent Application No. 2015-098297, filed on May 13, 2015; and Japanese Patent Application No. 2015-219449, filed on Nov. 9, 2015, the entireties of which are hereby incorporated by reference.

TECHNICAL FIELD

The present invention relates to a packaging material for a power storage device.

BACKGROUND

Recently, nickel hydride storage batteries and lead storage batteries are known to be used as power storage devices such as secondary batteries. In many cases, these power storage devices are required to be small-sized due to downsizing of mobile devices, limitations of installation space, and the like. Accordingly, attention is being paid to lithium-ion batteries, having high energy density. As a packaging material (hereinafter, also referred to simply as a "packaging material") used for a lithium ion battery, although a metallic can has been widely used, a multilayer film that is light, has high radiation performance, and can be applied at low cost has come to be increasingly used.

An electrolytic solution of a lithium ion battery is composed of an aprotic solvent such as propylene carbonate, ethylene carbonate, dimethyl carbonate, diethyl carbonate or ethylmethyl carbonate, and an electrolyte. A lithium salt such as $LiPF_6$ or $LiBF_4$ may be used as the electrolyte. However, these lithium salts may generate hydrofluoric acid due to a hydrolysis reaction with water. Hydrofluoric acid causes corrosion of the metal surface of a battery member and a decrease of the laminate bond strength between layers of the packaging material formed of the multilayer film.

Accordingly, a barrier layer formed of a metal foil such as an aluminum foil is provided inside a packaging material formed of a multilayer film in order to prevent water from entering through the surface of the multilayer film. For example, there is a known packaging material in which a base layer having heat-resistance/a first adhesive layer/a barrier layer/a corrosion protection layer which prevents corrosion due to hydrofluoric acid/a second adhesive layer/a sealant layer are sequentially laminated. The lithium-ion battery which uses the above-described packaging material is also referred to as an aluminum laminate type lithium-ion battery.

As one type of an aluminum laminate type lithium-ion battery, a lithium-ion battery is known in which a recess is formed on a part of the packaging material by cold forming, the battery contents such as a positive electrode, a separator, a negative electrode, an electrolytic solution, etc., are accommodated in the recess, and the remaining portions of the packaging material are folded and the edge portions are sealed by heat-sealing. Such a battery is also referred to as an embossed type lithium ion battery. Recently, for the purpose of increasing the energy density, an embossed type lithium-ion battery having recesses on both sides of the packaging materials to be bonded together has been produced. This type of lithium-ion battery can accommodate more battery contents.

The energy density of the lithium-ion battery increases as the depth of the recess formed by cold forming increases. However, pinholes or breaking readily occur during forming of the packaging material as the formed recess becomes deeper. Accordingly, a stretched film is used for the base layer of the packaging material to protect the barrier layer (metal foil). As described above, the base layer is typically joined with the barrier layer via an adhesive layer (for example, refer to PTL 1).

CITATION LIST

Patent Literature

[PTL 1] JP-B-3567230

SUMMARY OF THE INVENTION

Technical Problem

PTL 1 uses a stretched polyamide film or a stretched polyester film having a tensile strength and a tensile elongation amount set to a prescribed value or more as the base layer in order to improve the formability. However, when a stretched polyamide film is used, there is a problem that the stretched polyamide film dissolves when the electrolyte adheres to the stretched polyamide film during the electrolyte injection step, etc. Further, when a stretched polyester film is used, there is a problem that the toughness decreases, thus the formability is deteriorated.

Taking the aforementioned circumstances into consideration, it is an object of the present invention to provide a packaging material for a power storage device which can maintain a sufficient formability, and has electrolytic resistance with which the packaging material is resistant to degradation caused by contact with the electrolyte. Further, another object of the present invention is to provide a power storage device obtained by using the packaging material for a power storage device.

Solution to Problem

An aspect of the present invention provides a packaging material for a power storage device, the packaging material comprising: a coating layer disposed directly on a first surface of a metal foil or disposed via a first corrosion protection layer; and a second corrosion protection layer, a sealant adhesive layer, and a sealant layer disposed in this sequence on a second surface of the metal foil, wherein the coating layer is produced from an aromatic polyimide resin made of a tetracarboxylic dianhydride or derivatives thereof and a diamine or derivatives thereof, and has a tensile elongation in a tensile test (in compliance with JIS K7127, JIS K7127 specimen type 5, tensile rate 50 mm/min) is not less than 20% in an MD direction and a TD direction.

According to the above aspect of the present invention, the packaging material can maintain a sufficient formability and have electrolytic resistance with which the packaging material is resistant to degradation caused by contact with the electrolyte, as well as having improved and even high heat-resistance.

In the above aspect of the present invention, the aromatic polyimide resin preferably contains at least one skeleton selected from the group consisting of a skeleton having aromatic rings bonded together via an ether group, ketone group, sulfonyl group or ester group, and a biphenyl skeleton. This contributes to improvement in formability.

Further, in the above aspect of the present invention, the diamine or derivatives thereof are preferably at least one selected from the group consisting of 1,3-bis(4-aminophenoxy) benzene, 1,4-bis(4-aminophenoxy) benzene, bis(4-(4-aminophenoxy)phenyl) ketone, bis(4-(4-aminophenoxy)phenyl) sulfone, bis(4-(4-aminophenoxy)phenyl) sulfide, 2,2-bis(4-(4-aminophenoxy)phenyl) propane and 4,4'-bis(4-aminophenoxy) biphenyl. This further contributes to improvement in formability and improvement in solubility of the polyimide resin.

Further, in the above aspect of the present invention, the coating layer may be produced from an aromatic polyimide resin made of an aromatic tetracarboxylic dianhydride having at least one binding group selected from the following group (A) or derivatives thereof and a diamine or derivatives thereof, or a diamine having at least one binding group selected from the following group (A) or derivatives thereof and an aromatic tetracarboxylic dianhydride or derivatives thereof:

Group (A): the group consisting of ether group (—O—), sulfide group (—S—), ketone group (—CO—), ester group (—COO—) and sulfonyl group (—SO$_2$—).

This further contributes to improvement in formability and electrolytic resistance.

In this case, the coating layer may be produced from an aromatic polyimide resin made of at least one aromatic tetracarboxylic dianhydride selected from the following group (B) and a diamine or derivatives thereof, or at least one diamine selected from the following group (C) or derivatives thereof and an aromatic tetracarboxylic dianhydride or derivatives thereof:

Group (B): the group consisting of 4,4'-oxidiphthalic acid anhydride, 3,3',4,4'-biphenyl tetracarboxylic dianhydride, 3,3',4,4'-diphenyl sulfone tetracarboxylic dianhydride and 3,3',4,4'-benzophenone tetracarboxylic dianhydride, and Group (C): the group consisting of 4,4'-diaminodiphenyl ether, bis(4-aminophenyl) sulfoxide, bis(4-aminophenyl) sulfone, 2,2'-bis {4-(4-aminophenoxy) phenyl} propane, 4,4'-diaminobenzophenone and 3,3'-diaminobenzophenone.

This further contributes to improvement in formability and electrolytic resistance.

Further, in the above aspect of the present invention, at least one of the first corrosion protection layer and the second corrosion protection layer preferably has a thickness in the range of 10 nm to 5 μm. Moreover, the first corrosion protection layer preferably has a thickness in the range of 50 nm to 3 μm. This further contributes to improvement in adhesiveness between the metal foil and the coating layer and improvement in formability.

In the above aspect of the present invention, the coating layer preferably has a thickness in the range of 3 to 30 μm. This further contributes to improvement in formability and reduction in thickness.

Another aspect of the present invention provides a power storage device in which a power storage device element is sealed by the packaging material for a power storage device according to the above aspect of the present invention.

Advantageous Effects of Invention

The present invention can provide a packaging material for a power storage device which can maintain a sufficient formability and have electrolytic resistance with which the packaging material is resistant to degradation caused by contact with the electrolyte. The present invention can provide a power storage device obtained by using the above packaging material for a power storage device. Moreover, in the present invention, an adhesive layer which is typically used to adhere a stretched film to a barrier layer is not necessarily required, and reduction in the cost and reduction in thickness can also be achieved. In particular, as a result of reducing the layer thickness of the packaging material, more battery contents can be housed in a limited space in housings of smartphones or the like.

DESCRIPTION OF REPRESENTATIVE EMBODIMENTS

<Packaging Material for Power Storage Device>

Figure 1:
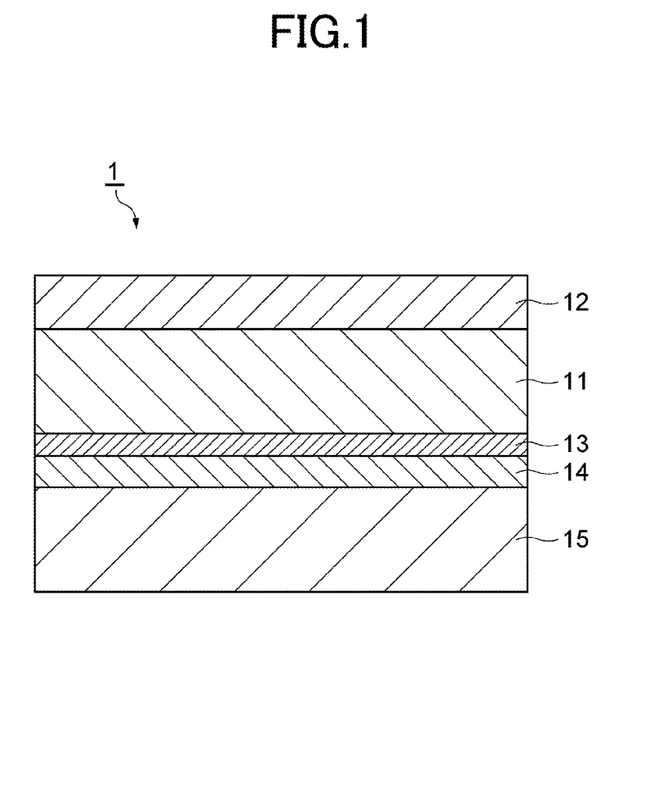
FIG. 1 is a cross-sectional view of a packaging material for a power storage device according to an embodiment of the present invention.

It will be understand that the following descriptions of embodiments are intended to be representative of the invention and that the invention is not necessarily limited to these embodiments. With reference to FIG. 1, an embodiment of the present invention will be described. FIG. 1 is a cross-sectional view of a packaging material for a power storage device (hereinafter, simply referred to as a "packaging material") 1 of the present embodiment.

Figure 2:
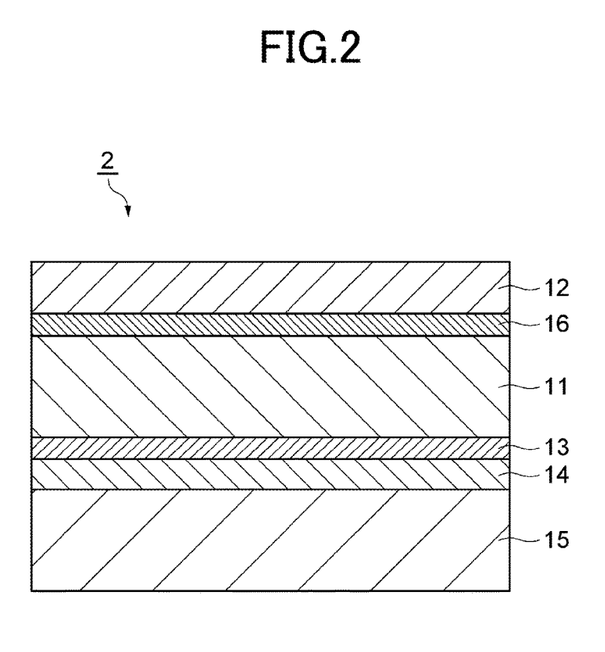
FIG. 2 is a cross-sectional view of a packaging material for a power storage device according to another embodiment of the present invention.

A packaging material of the present embodiment includes a coating layer disposed directly on a first surface of a metal foil, and includes a second corrosion protection layer, a sealant adhesive layer, and a sealant layer disposed in this sequence on a second surface of the metal foil. Namely, as shown in FIG. 1, the packaging material 1 includes a metal foil 11 which exhibits a barrier function, a coating layer 12 disposed directly on a first surface of the metal foil 11, and a second corrosion protection layer 13, a sealant adhesive layer 14 and a sealant layer 15 disposed in this sequence on a second surface of the metal foil 11. Further, as shown in FIG. 2, a packaging material of another embodiment (packaging material 2 for a power storage device) includes a first corrosion protection layer 16 disposed between the metal foil 11 and the coating layer 12. Namely, the packaging material 2 includes the metal foil 11, and the coating layer 12 disposed on the first surface of the metal foil 11 with the first corrosion protection layer 16 interposed therebetween, and includes the second corrosion protection layer 13, the sealant adhesive layer 14 and the sealant layer 15 disposed in this sequence on the second surface of the metal foil 11. When these packaging materials are used for forming the power storage device, the coating layer 12 becomes an outermost layer and the sealant layer 15 becomes an innermost layer.

[Metal Foil]

Various metal foils including aluminum, stainless steel, copper, and nickel may be used as the metal foil 11. Of these metal foils, an aluminum foil is preferred in view of moisture resistance, processability such as ductility, and costs, and a copper foil or a nickel foil is preferred in view of rigidity. The aluminum foil may be a general soft aluminum foil. Among others, an iron-containing aluminum foil is preferred in view of having good pinhole resistance as well as ductility and malleability during forming.

The content of iron in the iron-containing aluminum foil (100 mass %) is preferably in the range of 0.1 to 9.0 mass %, and more preferably in the range of 0.5 to 2.0 mass %. When the content of iron is 0.1 mass % or more, the packaging material 1 has good pinhole resistance and as well as ductility and malleability. When the content of iron is 9.0 mass % or less, the packaging material 1 has good flexibility.

The thickness of the metal foil 11 is preferably in the range of 9 to 200 μm, more preferably in the range of 15 to 100 μm, in view of barrier properties, pinhole resistance, processability and the like.

[Coating Layer]

The coating layer 12 serves to impart heat resistance in the sealing step during production of the power storage device and electrolytic resistance which does not deteriorate even when in contact with the electrolyte. In addition, the coating layer 12 serves to improve a forming depth in the deep drawing process, and inhibits generation of pinholes that may occur during processing or distribution.

The coating layer 12 is made of an aromatic polyimide resin, and disposed on the first surface of the metal foil 11 or on the first corrosion protection layer 16 formed on the first surface of the metal foil 11, preferably without an adhesive layer interposed therebetween. In this case, the coating layer 12 can be formed by applying a resin material for forming the coating layer on the first surface of the metal foil 11 or on the first corrosion protection layer 16. If an adhesive layer is used, an adhesive which will be described below with regard to the sealant adhesive layer 14 can be used.

The aromatic polyimide resin that forms the coating layer 12 has electrolytic resistance and high heat resistance. Since polyimide resin is normally insoluble in a solvent, a process is required by which a coating film of polyamic acid varnish (organic soluble matter) which is a precursor of polyimide resin produced by reacting a tetracarboxylic dianhydride with a diamine, which are the raw materials, is first coated on the metal foil or the like, and dried at high temperature to volatize the organic solvent, and then heated to imidize the polyamic acid. The heat processing conditions may be 120 to 350° C., preferably 150 to 250° C., for a period of 1 minute to 6 hours by using hot air or infrared radiation. However, the process of imidization at high temperatures after the coating process can be eliminated by using polyimide varnish which is soluble in a solvent.

In this embodiment, an aromatic polyimide resin preferably has a skeleton having aromatic rings bonded together via a predetermined binding group or a biphenyl skeleton. These skeletons can be included in the resin to improve solubility in a solvent. Examples of the binding group include an ether group, ketone group, sulfonyl group, sulfide group, sulfoxide group, methylene group, isopropylidene group, hexafluoro isopropylidene group, and ester group. Among others, the ether group, ketone group, sulfonyl group or ester group is preferably used in view of improvement in solubility. These skeletons can be included in the resin not only to improve solubility in a solvent, but also impart bendability and elasticity to the resin to thereby exhibit flexibility of the coating film. With use of the tetracarboxylic dianhydride having the above skeleton or derivatives thereof or the diamine having the above skeleton or derivatives thereof as a raw material, an aromatic polyimide resin having high solubility can be obtained.

Examples of the tetracarboxylic dianhydride having the above skeleton include 4,4'-oxidiphthalic acid anhydride, 4,4'-(4,4'-isopropylidenediphenoxy) bisphthalic anhydride, bis(4-((3,4-dicarboxyphenyl)thio)phenyl) ether dianhydride, 3,3',4,4'-benzophenone tetracarboxylic dianhydride, bis(3,4-dicarboxy phenyl) sulfone dianhydride, bis(3,4-dicarboxy phenyl) sulfide dianhydride, bis(3,4-dicarboxy phenyl) methane dianhydride, 2,2-bis(3,4-dicarboxy phenyl) propane dianhydride, 2,2-bis(4-(3,4-dicarboxy phenoxy)phenyl) propane dianhydride, 2,2-bis(3,4-dicarboxy phenyl)-1,1,1,3,3,3-hexafluoropropane dianhydride, and 3,3',4,4'-biphenyl tetracarboxylic dianhydride.

Examples of the diamine having the above skeleton includes 4,4'-diaminodiphenyl ether, 3,4'-diaminodiphenyl ether, 1,3-bis(4-aminophenoxy) benzene, 1,4-bis(4-aminophenoxy) benzene, bis(4-(4-aminophenoxy)phenyl) ketone, bis(4-(4-aminophenoxy)phenyl) sulfone, bis(4-(4-aminophenoxy)phenyl) sulfide, bis(4-(4-aminophenoxy) phenyl) sulfoxide, bis(4-(4-aminophenoxy) phenyl) methane, 2,2-bis(4-(4-aminophenoxy) phenyl) propane, 2,2-bis(4-(4-aminophenoxy) phenyl)-1,1,1,3,3,3-trifluoropropane, 1,4-bis(4-(4-aminophenoxy) benzoyl) benzene, 4,4'-bis(4-aminophenoxy) benzene, 3,3'-diaminobenzophenone, 4,4'-diaminobenzophenone, 4,4'-bis(4-aminophenoxy) biphenyl, bis(3-aminophenyl) sulfone, bis(4-aminophenyl) sulfone, bis(4-aminophenyl) sulfide, bis(4-aminophenyl) sulfoxide, 3,3'-diaminodiphenylmethane, 4,4'-diaminodiphenylmethane, and 4,4'-diaminobiphenyl. Among others, it is particularly preferred to use at least one selected from the group consisting of 1,3-bis(4-aminophenoxy) benzene, 1,4-bis(4-aminophenoxy) benzene, bis(4-(4-aminophenoxy)phenyl) ketone, bis(4-(4-aminophenoxy)phenyl) sulfone, bis(4-(4-aminophenoxy)phenyl) sulfide, 2,2-bis(4-(4-aminophenoxy)phenyl) propane and 4,4'-bis(4-aminophenoxy) biphenyl since the solubility improves by containing many aromatic rings in the main chain structure.

For preparation of the polyamic acid, known organic solvents conventionally used for preparation of polyamic acid can be used. Examples of the organic solvent include N,N-dimethylformamide, N,N-diethylformamide, N,N-dimethylacetamide, N,N-diethylacetamide, N,N-dimethyl methoxyacetamide, N-methyl-2-pyrrolidone, N-ethyl-2-pyrrolidone, 1,3-dimethyl-2-imidazolidinone, N-methylcaprolactam, hexamethylphosphoric triamide, 1,2-dimethoxyethane, bis(2-methoxyethyl) ether, 1,2-bis(2-methoxyethoxy) ethane, tetrahydrofuran, bis[2-(2-methoxyethoxy) ethyl] ether, 1,4-dioxane, dimethylsulfoxide, dimethylsulfone, diphenyl ether, sulfolane, diphenyl sulfone, tetramethylurea, anisole, m-cresol, phenol, and γ-butyrolactone. These solvents may be used singly or in combination of two or more. In view of solubility and safety of the polyamic acid, among these solvents, N,N-dimethylacetamide, N,N-diethylacetamide, N-methyl-2-pyrrolidone, N-ethyl-2-pyrrolidone, 1,3-dimethyl-2-imidazolidinone, and γ-butyrolactone are preferably used, and, N-methyl-2-pyrrolidone, N-ethyl-2-pyrrolidone, and γ-butyrolactone are more preferably used.

Among the above solvents, N,N-dimethylformamide, N,N-dimethylacetamide, N,N-diethylacetamide, N,N-diethylformamide, N,N-dimethylmethoxyacetamide, N-methyl-2-pyrrolidone, N-ethyl-2-pyrrolidone, γ-butyrolactone, and the like are particularly advantageously used to dissolve the aromatic polyimide resin. The above solvents may be used singly or in combination of two or more.

Alternatively, the coating layer of the present embodiment may be made of a polyimide resin obtained by using an aromatic tetracarboxylic dianhydride having at least one binding group selected from the group (A) described below or derivatives thereof and a diamine or derivatives thereof, or may be made of a polyimide resin obtained by using a diamine having at least one binding group selected from the group (A) described below or derivatives thereof and an aromatic tetracarboxylic dianhydride or derivatives thereof. That is, specifically, the coating layer of the present embodiment may be made of a polyimide resin obtained through heating process of polyamic acid obtained by reaction of these aromatic tetracarboxylic dianhydrides with diamines, followed by curing reaction.

Group (A): the group consisting of ether group (—O—), sulfide group (—S—), ketone group (—CO—), ester group (—COO—) and sulfonyl group (—$SO_2$—)

The inventors consider that these binding groups can improve bendability and elasticity to thereby achieve flexibility of the coating film. The inventors further consider that aromatic components contained in the coating layer exhibit a strong stack-stack interaction between the planes of aromatic components to thereby achieve a layer with improved or even high strength. Accordingly, it is considered that combining the components having flexibility and the components having improved or even high strength enables a coating layer with improved or even higher toughness and prevents breakage or the like of the metal foil.

In this case, the coating layer may be made of a polyimide resin obtained by using at least one aromatic tetracarboxylic dianhydride selected from the group (B) described below and a diamine or derivatives thereof, or may be made of a polyimide resin obtained by using at least one diamine selected from the group (C) described below and an aromatic tetracarboxylic dianhydride or derivatives thereof. That is, specifically, the coating layer of the present embodiment may be made of a polyimide resin obtained through a heating process of polyamic acid obtained by reaction of these aromatic tetracarboxylic dianhydrides with diamines, followed by curing reaction. The materials listed below in the group (B) and the group (C) are considered to impart flexibility to a polyimide resin.

Group (B): the group consisting of 4,4'-oxidiphthalic acid anhydride, 3,3',4,4'-biphenyl tetracarboxylic dianhydride, 3,3',4,4'-diphenyl sulfone tetracarboxylic dianhydride and 3,3',4,4'-benzophenone tetracarboxylic dianhydride Group (C): the group consisting of 4,4'-diaminodiphenyl ether, bis(4-aminophenyl) sulfoxide, bis(4-aminophenyl) sulfone, 2,2'-bis{4-(4-aminophenoxy) phenyl} propane, 4,4'-diaminobenzophenone and 3,3'-diaminobenzophenone Among the aromatic tetracarboxylic dianhydrides or derivatives thereof, examples of those which are not included in the group (B) include pyromellitic acid anhydride, naphthalene-1,4,5,8-tetracarboxylic dianhydride, 2,3,6,7-naphthalene tetracarboxylic dianhydride, 3,4,9,10-perylene tetracarboxylic dianhydride, and 4,4'-(hexafluoro isopropylidene) diphthalic acid anhydride.

Among the diamines or derivatives thereof, examples of those which are not included in the group (C) include p-phenylenediamine, m-phenylenediamine, 1,5-diamino naphthalene, benzidine, 4,4'-methylene bis(2-ethyl-6-methylaniline), and p-xylylenediamine.

The above tetracarboxylic dianhydrides or derivatives thereof and the diamines or derivatives thereof may be used singly or in combination of two or more.

Furthermore, to the extent that ensures high solubility, other tetracarboxylic dianhydrides or diamines than those listed above may be included in the synthetic materials for the aromatic polyimide resin. Examples of other tetracarboxylic dianhydrides or diamines than those listed above include pyromellitic acid dianhydride, o-phenylenediamine, m-phenylenediamine, and p-phenylenediamine.

In addition, in preparation of polyamic acid, other acid components than tetracarboxylic dianhydride may be included in the raw material. Examples of other acid components include any suitable acid component, for example, alicyclic dicarboxylic acid such as cyclohexanedicarboxylic acid; and aliphatic dicarboxylic acid such as adipic acid and sebacic acid. Other acid components may be used singly or in combination of two or more.

A mole ratio of the tetracarboxylic dianhydride component and the diamine component that constitute the polyamic acid in the coating layer 12 [tetracarboxylic dianhydride component/diamine component] is an approximately equal mole ratio, specifically in the range of 0.95 to 1.05, and preferably in the range of 0.97 to 1.03. If not within these ranges, there is a risk that the obtained polyimide resin may have low toughness.

The aromatic polyimide resin may contain aliphatic chain in the main chain. Containing the aliphatic chain improves solubility. However, if aliphatic chains are excessively contained, there is a risk that heat-resistance and tensile strength may be impaired. Therefore, the content of aliphatic chain is preferably appropriately adjusted.

The coating layer 12 also serves to protect the metal foil 11 and prevent occurrence of pinholes and breakage during forming of the packaging material 1. In order to ensure the above protective effect, a tensile elongation in the tensile test (in compliance with JIS K7127, JIS K7127 specimen type 5, tensile rate 50 mm/min) is required to be not less than 20% in an MD direction and a TD direction of the packaging material 1, preferably not less than 25%, more preferably not less than 30%, and further more preferably not less than 35%. When the tensile elongation is not less than 20%, occurrence of pinholes and breakage in the metal foil 11 can be prevented. Although the upper limit of the tensile elongation is not specifically provided, a sufficient protective effect can be achieved with the tensile elongation, for example, in the order of 60%, which does not need to be excessively increased. The tensile elongation of the packaging material 1 can be adjusted by the percentage of the skeletons described above contained in the molecular structure of the aromatic polyimide resin that constitutes the coating layer 12. When the content of the skeletons described above is excessively small, good bendability and elasticity tends not to be obtained. On the other hand, when the content of the skeletons described above is excessively large, good mechanical strength tends not to be obtained.

The coating layer 12 also serves to improve the degree of elongation of the metal foil. The metal foil, for example, a soft aluminum foil 8079 (manufactured by Toyo aluminum K.K., thickness of 30 μm) is a material that is not readily elongated, and is broken at the tensile elongation of approximately 10% in the tensile test under the above tensile test conditions. In the deep drawing molding process, the packaging material is compressed by a punch of a molding machine. In particular, a portion of the packaging material which is in contact with a corner of the punch is highly elongated. Further, as the molding depth increases, the packaging material is elongated to a larger extent. If the packaging material itself has low resistance to elongation, breakage readily occurs. Accordingly, the coating layer is preferably designed to have high elongation in a tensile test. According to the knowledge of the inventors, a certain extent of correlation seems to be present between the molding depth and the tensile elongation in the tensile test. For deep drawing molding with a molding depth of approximately 4 mm or more, it is preferred to produce the coating layer having the tensile elongation in the tensile test of 20% or more as described above.

In the present embodiment, the coating layer 12 may be produced by using polyamideimide resin instead of polyimide resin. Polyamideimide resin has electrolytic resistance.

In the present embodiment, the polyamideimide resin is synthesized by a diisocyanate method by which acid components including tricarboxylic acid anhydride are reacted with diisocyanate components in any appropriate solvent. Further, an isocyanate method is excellent in operational efficiency compared with an acid chloride method by which trimellitic anhydride chloride is reacted with diamine and a direct polymerization method by which trimellitic acid anhydride is reacted with diamine. Further, examples of the above solvent include amide-based solvent such as N,N-dimethylformamide, N,N-dimethylacetamide, N,N-dimethylpropionamide, N-methyl-2-pyrrolidone, and N-ethyl-2-pyrrolidone, and lactone-based solvent such as γ-butyrolactone, γ-valerolactone, and δ-valerolactone.

The tricarboxylic acid anhydride in the above acid components may be, for example, trimellitic acid anhydride, and cyclohexane tricarboxylic acid anhydride. Among these described above, trimellitic acid anhydride is preferred in view of costs, reactivity, solubility and the like. The tricarboxylic acid anhydride may be used singly or in combination of two or more.

The above acid components may include other acid components than the tricarboxylic acid anhydride. Examples of other acid components include any suitable acid components, for example, tetracarboxylic dianhydride such as pyromellitic acid anhydride, biphenyl tetracarboxylic dianhydride, and oxidiphthalic acid anhydride; aromatic dicarboxylic acid such as terephthalic acid, and isophthalic acid; alicyclic dicarboxylic acids such as cyclohexane dicarboxylic acid; and aliphatic dicarboxylic acids such as adipic acid and sebacic acid. Other acid components may be used singly or in combination of two or more.

The diisocyanate contained in the diisocyanate components may be, for example, aromatic diisocyanate such as diphenylmethane diisocyanate, tolylene diisocyanate, tetramethylxylene diisocyanate, 3,3'-dimethylbiphenyl-4,4'-diisocyanate, and naphthalene diisocyanate; aliphatic isocyanate such as hexamethylene diisocyanate; and alicyclic diisocyanate such as isophorone diisocyanate, hydrogenated xylylene diisocyanate, norbornene diisocyanate, and dicyclohexylmethane diisocyanate. The diisocyanates may be used singly or in combination of two or more.

The diisocyanate components contain, from among the above diisocyanate, preferably aromatic diisocyanate, and more preferably diphenylmethane diisocyanate or 3,3'-dimethylbiphenyl-4,4'-diisocyanate. Using the diisocyanate components including aromatic diisocyanate enables synthesization of polyamideimide resin having improved elasticity.

The diisocyanate components further include polyol having a terminal hydroxyl group modified with diisocyanate. Using the diisocyanate components further including such isocyanate-modified polyol enables synthesization of polyamideimide resin having improved elongation. Further, examples of polyol include polycarbonate polyol, polyether polyol, and polyester polyol. Among others, polyester polyol is preferred. Polyester polyol is obtained by dehydration condensation of carboxylic acid and polyvalent alcohol. Examples of carboxylic acid include adipic acid, and phthalic acid, and examples of polyvalent alcohol include ethylene glycol, 1,4-butanediol, 1,6-hexanediol, and 3-methyl-1,5-pentanediol.

The diisocyanate that modifies the above mentioned polyol may be any suitable diisocyanate. Examples of such diisocyanate include aromatic diisocyanate such as diphenylmethane diisocyanate, tolylene diisocyanate, tetramethylxylene diisocyanate, 3,3'-dimethylbiphenyl-4,4'-diisocyanate, and naphthalene diisocyanate; aliphatic isocyanate such as hexamethylene diisocyanate; and alicyclic diisocyanate such as isophorone diisocyanate, hydrogenated xylylene diisocyanate, norbornene diisocyanate, and dicyclohexylmethane diisocyanate. These diisocyanates may be used singly or in combination of two or more.

In the present embodiment, the mole ratio of isocyanate-modified polyol to diisocyanate component (the molar amount of isocyanate-modified polyol/the total molar amount of diisocyanate component) is in the range of 0.005 to 0.25, and preferably in the range of 0.02 to 0.15. With the mole ratio in the range of 0.005 to 0.25, polyamideimide resin having high flexibility can be synthesized.

The thickness of the coating layer 12 is preferably in the range of 1 to 30 μm, more preferably in the range of 3 to 30 μm, and further more preferably in the range of 5 to 20 μm in view of maintaining electrolytic resistance and formability. When the thickness of the coating layer 12 is 1 μm or more, good formability can be maintained. On the other hand, when the thickness of the coating layer 12 is 30 μm or less, the packaging material can be thinner compared with the conventional art.

[Corrosion Protection Layer]

The first corrosion protection layer 16 and the second corrosion protection layer 13 (hereinafter, "corrosion protection layer") serve to prevent corrosion of the metal foil 11 by hydrofluoric acid generated by an electrolyte solution or reaction between an electrolyte solution and water. Further, the first corrosion protection layer 16 and the second corrosion protection layer 13 also serve to improve adhesiveness between the metal foil 11 and the sealant adhesive layer 12 (as well as adhesiveness between the metal foil 11 and an adhesive layer when the adhesive layer is provided on the first corrosion protection layer 16).

The corrosion protection layer may be a coating film formed by a coating or immersing type acid resistant anti-corrosion agent or a layer of metal oxide derived from the metal that constitutes the metal foil 11. Such a coating film or a layer has good anti-corrosion effect against acid. The coating film may be, for example, a coating film formed by ceria sol treatment using an anti-corrosion agent containing cerium oxide, a phosphate salt and various types of thermosetting resins, or a coating film formed by chromate treatment using an anti-corrosion agent containing a chromate salt, a phosphate salt, a fluoride and various types of thermosetting resins. In addition, the corrosion protection layer is not limited to these described above as far as sufficient anti-corrosion properties of the metal foil 11 can be achieved. For example, coating films formed by a phosphate treatment, a boehmite treatment and the like may also be used. On the other hand, the layer of metal oxide derived from the metal that constitutes the metal foil 11 may be a layer which corresponds to the metal foil 11 to be used. For example, when an aluminum foil is used as the metal foil 11, the aluminum oxide layer serves as the corrosion protection layer. These corrosion protection layers may be used as a single layer or in combination of a plurality of layers. Further, the first corrosion protection layer 16 and the second corrosion protection layer 13 may have the same configuration or different configurations. Moreover, an additive such as a silane coupling agent, polyacrylic acid, polyvinyl alcohol, and polyallylamine may be added to the corrosion protection layer.

The thickness of the corrosion protection layer is preferably in the range of 10 nm to 5 μm, more preferably in the range of 20 nm to 3 μm, further more preferably in the range of 20 to 500 nm, and still further more preferably in the range of 100 to 500 nm in view of anti-corrosion properties and anchoring properties. In addition, the thickness of the first corrosion protection layer, if provided, is preferably in the range of 50 nm to 3 μm.

With the configuration having the first corrosion protection layer 16 provided between the metal foil 11 and the coating layer 12, adhesiveness between the metal foil 11 and the coating layer 12 is improved and the tensile elongation tends to be improved. When the thickness of the first corrosion protection layer 16 is 10 nm or more, the adhesiveness tends to be improved. On the other hand, when the thickness is more than 5 μm, prevention of pinholes or breakage of the metal foil 11 tends to be deteriorated.

[Sealant Adhesive Layer]

The sealant adhesive layer 12 is a layer that adheres the metal foil 11 on which the second corrosion protection layer 13 is formed to the sealant layer 15. The packaging material 1 is broadly classified into two types depending on the adhesive components constituting the sealant adhesive layer 14, that is, a thermal laminate structure and a dry laminate structure.

For the thermal laminate structure, the adhesive component constituting the sealant adhesive layer 12 is preferably an acid-modified polyolefin resin made of a polyolefin resin graft-modified with an acid such as maleic anhydride. The acid-modified polyolefin resin is made by introducing a polar group into a part of the non-polar polyolefin resin. Accordingly, the acid-modified polyolefin resin can be tightly adhered to both layers when a non-polar layer formed of a polyolefin resin film or the like is used as the sealant layer 15 and a polar layer is used as the second corrosion protection layer 13. In addition, use of the acid-modified polyolefin resin improves the resistance to the content such as electrolyte solution and tends to prevent lowering of adhesiveness due to deterioration of the sealant adhesive layer 12 which is caused by generation of hydrofluoric acid in the battery. The acid-modified polyolefin resin used for the sealant adhesive layer 12 may be one or more.

Examples of the polyolefin resin used for the acid-modified polyolefin resin includes low density, medium density or high density polyethylene; ethylene-α olefin copolymers; homo polypropylene, block polypropylene or random polypropylene; and propylene-α olefin copolymers. Further, copolymers obtained by copolymerizing the above compounds with a polar molecule such as acrylic acid or methacrylic acid, and polymers such as crosslinking polyolefins may also be used. The acid that modifies the polyolefin resin includes carboxylic acid, and acid anhydride, in which maleic anhydride is preferred.

In the thermal laminate structure, the sealant adhesive layer 12 can be formed by extruding the above adhesive components by using a co-extrusion machine.

For the dry laminate structure, the adhesive component of the sealant adhesive layer 12 may be, for example, a two-liquid curing type polyurethane adhesive composed of a base resin such as polyester polyol, polyether polyol or acryl polyol and a hardener of a bifunctional or higher functional aromatic or aliphatic isocyanate compound. However, since the polyurethane adhesive has a binding portion having high hydrolyzability such as an ester group or a urethane group, the thermal lamination structure is preferably used for the applications demanding higher reliability.

The sealant adhesive layer 12 of the dry laminate structure can be formed by applying the adhesive component on the second corrosion protection layer 13, and they drying the adhesive component. Further, when a polyurethane adhesive is used, the polyurethane adhesive can be aged, for example, at 40° C. for four days or more after application to promote reaction between the hydroxyl group of the base resin and the isocyanate group of the hardener, thereby providing strong adhesion.

The thickness of the sealant adhesive layer 12 is preferably in the range of 2 to 50 μm, and more preferably in the range of 3 to 20 μm, in view of adhesiveness, conformity, processability and the like.

Further, as described above, when an adhesive layer is provided on the first surface of the metal foil 11 during forming of the coating layer 12, an adhesive that constitutes the adhesive layer may be, for example, a two-liquid curing type polyurethane adhesive described above in connection with the dry laminate structure of the sealant adhesive layer 14. The thickness of the adhesive layer is preferably in the range of 1 to 10 μm, and more preferably in the range of 3 to 7 μm, in view of adhesiveness, conformity, processability and the like.

[Sealant Layer]

The sealant layer 15 serves to impart sealing properties to the packaging material 1. The sealant layer 15 includes resin films formed of a polyolefin resin or an acid-modified polyolefin resin made of a polyolefin resin graft-modified with an acid such as maleic anhydride.

Examples of the polyolefin resin includes low density, medium density or high density polyethylene; ethylene-α olefin copolymers; homo polypropylene, block polypropylene or random polypropylene; and propylene-α olefin copolymers. Those polyolefin resins may be used singly or in combination of two or more.

The acid that modifies the polyolefin resin includes those listed above in connection with the description of the sealant adhesive layer 14.

The sealant layer 15 may be a single-layer film or a multi-layer film, which may be selected depending on the desired properties. For example, a multi-layer film containing resins such as an ethylene-cyclic olefin copolymer or polymethylpentene may be used for imparting moisture resistance.

Moreover, the sealant layer 15 may be formulated with various types of additives such as a flame retardant, slip agent, anti-blocking agent, antioxidant, light stabilizer and tackifier.

The thickness of the sealant layer 15 is preferably in the range of 10 to 100 μm, and more preferably in the range of 20 to 60 μm in view of ensuring insulation.

The packaging material 1 may be formed by dry lamination of the sealant layer 15. However, in view of improving adhesiveness, the sealant layer 15 is preferably laminated on the sealant adhesive layer 14, which is made of an acid-modified polyolefin resin, by sandwich-lamination or co-extrusion.

<Production Method of Packaging Material for Power Storage Device>

A method for producing the packaging material 1 of the present embodiment will be described. Specifically, the methods which include the following steps (1) to (3) can be used as the production method. However, the method described below is an example, and the method for producing the packaging material 1 is not limited thereto.

Step 1: A step of forming the second corrosion protection layer 13 on at least one surface (second surface) of the metal foil 11

Step 2: A step of forming the coating layer 12 made of a raw material for a coating layer (resin material) on a first surface of the metal foil 11

Step 3: A step of bonding the sealant layer 15 to the second corrosion protection layer 13, which is formed on the second surface of the metal foil 11, via the sealant adhesive layer 14

(Step 1)

A corrosion protection treatment agent is applied on one surface (in some cases, both surfaces) of the metal foil 11 and dried to thereby form the second corrosion protection layer 13 on the second surface (in some cases, further form the first corrosion protection layer 16 on the first surface). The corrosion protection treatment agent may be a corrosion protection treatment agent for the aforementioned ceria sol treatment, a corrosion protection treatment agent for the chromate treatment or the like. The method of coating the corrosion protection treatment agent is not particularly limited, and various methods including gravure coating, reverse coating, roll coating, and bar coating may be used. Alternatively, both surfaces of the metal foil 11 are oxidized to form metal oxide layers (the first corrosion protection layer 16 and the second corrosion protection layer 13) derived from the metal that constitutes the metal foil 11 on both surfaces of the metal foil 11. Furthermore, one surface of the metal foil 11 may be treated by a corrosion protection treatment agent, and the other surface may be oxidized.

(Step 2)

A raw material for the coating layer (resin material) for forming the coating layer is applied on the first surface of the metal foil 11 or on the first corrosion protection layer 16 formed on the first surface, and dried to thereby form the coating layer 12. The method of coating is not particularly limited, and various methods including gravure coating, reverse coating, roll coating, and bar coating may be used. After coating, the solvent is dried at a temperature of, for example, 170° C. or more to thereby obtain the coating layer 12. In Step 2, a step such as aging is not necessary. As a result, the cycle time can be reduced, thereby having the potential of significantly improving the production efficiency.

(Step 3)

The sealant adhesive layer 12 is formed on the second corrosion protection layer 13 of the laminate, which is made up of the coating layer 12, (in some cases, the first corrosion protection layer 16), the metal foil 11, and the second corrosion protection layer 13 laminated in this sequence. Then, the laminate is bonded to the resin film that constitutes the sealant layer 15. The sealant adhesive layer 12 and the sealant layer 15 may also be laminated on the laminate by co-extrusion. Further, one of both surfaces of the resin film that constitutes the sealant layer 15, which is at least bonded to the sealant adhesive layer 14, may be subjected to a corona treatment.

The packaging material 1 or 2 is obtained by Steps (1) to (3) described above. The order of steps for the production method of the packaging material 1 or 2 is not limited to the sequential execution of Steps (1) to (3). For example, Step (2) may be performed after Step (3) is performed.

<Power Storage Device>

Two sheets of the thus obtained packaging materials 1 or 2 are prepared and arranged so that the sealant layers 15 face each other. Alternatively, one sheet of the packaging material 1 or 2 is folded so that portions of the sealant layer 15 face each other. The peripheral edges are joined by heat sealing with a power generation element and a tab member that serves as a terminal disposed inside. Thus, a cell of the power storage device using the packaging material 1 is produced. That is, the power storage device of the present embodiment is formed by sealing a power storage device element with the packaging material for a power storage device of the present embodiment.

While the embodiment of the present invention was described in detail with reference to the drawings, the specific configuration is not limited the above embodiment. Design modifications and the like are contemplated, without departing from the principle of the present invention.

EXAMPLES

[Materials for Use]

Materials used for producing the packaging material of Examples and Comparative Examples are shown below.

(Coating Layer)

TABLE 1

| Coating Layer | Resin | Tetracarboxylic dianhydride component | Diamine component | Thickness (μm) |
|---|---|---|---|---|
| A-1 | Polyimide resin | 4,4'-oxidiphthalic acid anhydride | 1,3-bis(4-aminophenoxy) benzene | 10 |
| A-2 | | 4,4'-oxidiphthalic acid anhydride | 4,4'-bis(4-aminophenoxy) biphenyl | 10 |
| A-3 | | 4,4'-oxidiphthalic acid anhydride | 2,2-bis(4-(4-aminophenoxy) phenyl) propane | 10 |
| A-4 | | 3,3',4,4'-benzophenone tetracarboxylic dianhydride | 1,3-bis(4-aminophenoxy) benzene | 10 |
| A-5 | | 3,3',4,4'-benzophenone tetracarboxylic dianhydride | 4,4'-bis(4-aminophenoxy) biphenyl | 10 |
| A-6 | | bis(3,4-dicarboxy phenyl) sulfide dianhydride | bis(4-(4-aminophenoxy) phenyl) sulfone | 10 |

TABLE 1-continued

| Coating Layer | Resin | Tetracarboxylic dianhydride component | Diamine component | Thickness (μm) |
|---|---|---|---|---|
| A-7 | | 3,3',4,4'-biphenyl tetracarboxylic dianhydride | 4,4'-bis(4-aminophenoxy) biphenyl | 10 |
| A-8 | | 4,4'-oxidiphthalic acid anhydride | 4,4'-bis(4-aminophenoxy) biphenyl | 10 |
| A-9 | | 4,4'-oxidiphthalic acid anhydride | 4,4'-bis(4-aminophenoxy) biphenyl | 10 |
| A-10 | | 4,4'-oxidiphthalic acid anhydride | 4,4'-bis(4-aminophenoxy) biphenyl | 2 |
| A-11 | | 4,4'-oxidiphthalic acid anhydride | 4,4'-bis(4-aminophenoxy) biphenyl | 3 |
| A-12 | | 4,4'-oxidiphthalic acid anhydride | 4,4'-bis(4-aminophenoxy) biphenyl | 5 |
| A-13 | | 4,4'-oxidiphthalic acid anhydride | 4,4'-bis(4-aminophenoxy) biphenyl | 20 |
| A-14 | | 4,4'-oxidiphthalic acid anhydride | 4,4'-bis(4-aminophenoxy) biphenyl | 30 |
| A-15 | | 2,2-bis(4-(3,4-dicarboxy phenoxy)phenyl) propane dianhydride | 2,2-bis(4-(4-aminophenoxy) phenyl) propane | 10 |
| A-16 | Polyurethane resin | Cured with isocyanate-based hardener ([NCO]/[OH] = 1) | | 10 |
| A-17 | | Cured with isocyanate-based hardener ([NCO]/[OH] = 3) | | 10 |
| A-18 | | Biaxially stretched Nylon film | | 15 |
| A-19 | | Biaxially stretched PET film | | 12 |

TABLE 2

| No. | | Tetracarboxylic dianhydride component | Diamine component | Thickness (μm) |
|---|---|---|---|---|
| A-20 | Polyimide resin | 4,4'-oxidiphthalic acid anhydride | 4,4'-diaminodiphenyl ether | 10 |
| A-21 | | 3,3',4,4'-biphenyl tetracarboxylic dianhydride | 4,4'-diaminodiphenyl ether | 10 |
| A-22 | | 3,3',4,4'-diphenyl sulfone tetracarboxylic dianhydride | 4,4'-diaminodiphenyl ether | 10 |
| A-23 | | 3,3',4,4'-benzophenone tetracarboxylic dianhydride | 4,4'-diaminodiphenyl ether | 9 |
| A-24 | | 3,3',4,4'-benzophenone tetracarboxylic dianhydride | bis(4-aminophenyl) sulfone | 9 |
| A-25 | | 3,3',4,4'-benzophenone tetracarboxylic dianhydride | 2,2'-bis[4-(4-aminophenoxy) phenyl] propane | 11 |
| A-26 | | 4,4'-oxidiphthalic acid anhydride | 3,3'-diaminobenzophenone | 13 |
| A-27 | | 3,3',4,4'-biphenyl tetracarboxylic dianhydride | bis(4-aminophenyl) sulfoxide | 12 |
| A-28 | | 4,4'-oxidiphthalic acid anhydride | bis(4-aminophenyl) sulfone | 11 |
| A-29 | | 3,3',4,4'-benzophenone tetracarboxylic dianhydride | p-phenylenediamine | 13 |
| A-30 | | pyromellitic acid dianhydride | 4,4'-diaminodiphenyl ether | 13 |
| A-31 | Urethane acrylate | NK oligo UA-122P (manufactured by Shin Nakamura Chemical Co., Ltd.)/IRGACURE 184 | | 12 |
| A-32 | | UV7000B (manufactured by Nippon Synthetic Chemical Industry Co., Ltd.)/IRGACURE 184 | | 11 |
| A-33 | | Biaxially stretched Nylon film | | 15 |
| A-34 | | Biaxially stretched PET film | | 12 |

(Adhesive Layer on the Coating Layer-Side)

Adhesive B-1: Polyester urethane adhesive (two-liquid curing type adhesive composed of polyester polyol and polyisocyanate: layer thickness 5 μm)

(Corrosion Protection Layer on the Coating Layer-Side: First Corrosion Protection Layer)

Corrosion protection layer C-1: Cerium oxide layer (layer thickness 50 nm)

Corrosion protection layer C-2: Cerium oxide layer (layer thickness 3 μm)

Corrosion protection layer C-3: Cerium oxide layer (layer thickness 100 nm)

(Metal Foil)

Metal foil D-1: soft aluminum foil 8079 (manufactured by UACJ Foil Corporation, thickness 30 μm)

Metal foil D-2: soft aluminum foil 8079 (manufactured by Toyo Aluminium K.K., thickness 30 μm)

(Corrosion Protection Layer on the Sealant Layer-Side: Second Corrosion Protection Layer)

Corrosion protection layer E-1: Cerium oxide layer (layer thickness 100 nm)

(Sealant Adhesive Layer)

Adhesive resin F-1: Polypropylene resin graft-modified with maleic anhydride (trade name "Admer", manufactured by Mitsui Chemicals Inc., layer thickness 20 μm)

(Sealant Layer)

Film G-1: Non-stretched polypropylene film having a corona treatment on the surface facing the corrosion protection layer E-1 on the sealant layer-side (layer thickness 40 μm).

[Production of Packaging Material]

The corrosion protection layer E-1 was formed on one surface of the metal foil D-1 or D-2 by direct gravure coating. Then, in the case where the corrosion protection layers C-1 to C-3 was provided, the corrosion protection layers C-1 to C-3 were formed by direct gravure coating on the other surface of the metal foil D-1 or D-2 on which the corrosion protection layer E-1 was not formed. Then, the coating layer raw materials A-1 (Example 1) to A-14 (Example 14) and A-20 (Example 15) to A-30 (Example 25) were applied on the other surface of the metal foil D-1 or D-2 directly or via the corrosion protection layers C-1 to C-3 to thereby form a coating layer.

On the other hand, in Comparative Examples, the coating layer raw materials A-15 (Comparative Example 1) to A-17 (Comparative Example 3) were applied on the other surface of the metal foil D-1 on which the corrosion protection layer E-1 was not formed to thereby form a coating layer. Further, the coating layer raw materials A-18 (Comparative Example 4), A-19 (Comparative Example 5), A-33 (Comparative Example 8) and A-34 (Comparative Example 9) were bonded to the other surface of the metal foil D-1 or D-2 on which the corrosion protection layer E-1 was not formed by dry lamination using the adhesive B-1.

Further, commercially available urethane acrylate oligomer was dissolved in methyl ethyl ketone. Then, 1-hydroxy-cyclohexyl-phenyl-ketone (trade name: IRGACURE 184, manufactured by BASF corporation) was added to the urethane acrylate oligomer at a solid content ratio of 5 mass % to thereby obtain the coating layer raw materials A-31 (Comparative Example 6) and A-32 (Comparative Example 7). As with the above Examples, either of the coating layer raw materials A-31 or A-32 was applied on the other surface of the metal foil D-2 directly or via the corrosion protection layer C-3, and dry-heated at 100° C. for 5 minutes. Ultraviolet light was irradiated to cure the coating layer by using a high pressure mercury lamp as a light source until the accumulated intensity becomes 1000 mJ/cm² to thereby form a coating layer on the metal foil. Thus, a laminate was obtained.

Then, the adhesive resin F-1 was extruded on the corrosion protection layer E-1 of the obtained laminate of Examples and Comparative Examples by using an extrusion machine to form a sealant adhesive layer. The film G-1 was then laminated on the sealant adhesive layer by sandwich lamination to thereby form a sealant layer. Through the aforementioned steps, the packaging material of Examples and Comparative Examples was produced.

[Evaluations]

Evaluations were conducted according to the following methods. Tables 3 and 4 show the evaluation results.

(Evaluation of Tensile Elongation)

A specimen type 5 in compliance with JIS K7127 (specimen width 6.0 mm) was prepared by using the packaging material obtained in each of Examples. The tensile test was conducted on the specimen in compliance with JIS K7127 under the conditions of gauge length of 35 mm and tensile rate of 50 mm/min. Evaluation was carried out based on the following criteria.

"A": The tensile elongation was 30% or more in both the MD direction and the TD direction.

"B": The tensile elongation was 25% or more in both the MD direction and the TD direction, and the tensile elongation was less than 30% in at least one of the MD direction and the TD direction.

"C": The tensile elongation was 20% or more in both the MD direction and the TD direction, and the tensile elongation was less than 25% in at least one of the MD direction and the TD direction.

"D": The tensile elongation was less than 20% in at least one of the MD direction and the TD direction.

(Evaluation of Formability)

The packaging material obtained in each of Examples were cut into a blank of 150 mm×190 mm, and cold-formed while changing the forming depth in the environment with room temperature of 23° C. and dew point of −35° C. to evaluate the formability. A punch having a shape of 100 mm×150 mm, a punch corner R (RCP) of 1.5 mm, a punch shoulder R (RP) of 0.75 mm and a die shoulder R (RD) of 0.75 mm was used. Evaluation was carried out based on the following criteria.

"A": Deep drawing to a forming depth of 4 mm or more was possible without causing breakage or cracking.

"B": Deep drawing to a forming depth of 3.5 mm or more and less than 4 mm was possible without causing breakage or cracking, but breakage or cracking occurred in deep drawing to a forming depth of 4 mm or more.

"C": Deep drawing to a forming depth of 3 mm or more and less than 3.5 mm was possible without causing breakage or cracking, but breakage or cracking occurred in deep drawing to a forming depth of 3.5 mm or more.

"D": Breakage or cracking occurred in deep drawing to a forming depth of less than 3 mm.

(Evaluation of Electrolytic Resistance)

An electrolyte (ethylene carbonate/dimethyl carbonate/diethyl carbonate=1:1:1 wt %, $LiPF_6$, 1M) with a small amount of water (1500 ppm) added thereto was dropped on the coating layer of the packaging material obtained in each of Examples, and wiped off with isopropyl alcohol after being left for 24 hours. Then, the outer appearance of the dropped site was evaluated. Evaluation was carried out based on the following criteria.

"A": The site on which the electrolyte was dropped was not recognized.

"B": A contour was formed at the site on which the electrolyte was dropped, but the site was not dissolved or damaged.

"C": The site on which the electrolyte was dropped was dissolved or damaged by the electrolyte.

TABLE 3

| Example | Metal foil | Coating layer | Adhesive layer on the coating layer-side | First corrosion protection layer | Tensile elongation | Formability | Electrolytic Resistance |
|---|---|---|---|---|---|---|---|
| Example 1 | D-1 | A-1 | — | — | B | B | A |
| Example 2 | D-1 | A-2 | — | — | B | B | A |
| Example 3 | D-1 | A-3 | — | — | C | C | B |
| Example 4 | D-1 | A-4 | — | — | B | B | A |
| Example 5 | D-1 | A-5 | — | — | B | B | A |
| Example 6 | D-1 | A-6 | — | — | B | B | A |
| Example 7 | D-1 | A-7 | — | — | B | B | A |
| Example 8 | D-1 | A-8 | — | C-1 | A | A | A |
| Example 9 | D-1 | A-9 | — | C-2 | A | A | A |
| Example 10 | D-1 | A-10 | — | C-1 | C | C | A |
| Example 11 | D-1 | A-11 | — | C-1 | B | B | A |
| Example 12 | D-1 | A-12 | — | C-1 | A | A | A |
| Example 13 | D-1 | A-13 | — | C-1 | A | A | A |
| Example 14 | D-1 | A-14 | — | C-1 | B | B | A |
| Comparative Example 1 | D-1 | A-15 | — | — | D | D | B |
| Comparative Example 2 | D-1 | D | — | — | D | D | C |
| Comparative Example 3 | D-1 | A-17 | — | — | D | D | B |
| Comparative Example 4 | D-1 | A-18 | B-1 | — | A | A | C |
| Comparative Example 5 | D-1 | A-19 | B-1 | — | D | D | A |

TABLE 4

| Example | Metal foil | Coating layer | Adhesive layer on the coating layer-side | First corrosion protection layer | Tensile elongation | Formability | Electrolytic Resistance |
|---|---|---|---|---|---|---|---|
| Example 15 | D-2 | A-20 | — | — | C | A | A |
| Example 16 | D-2 | A-21 | — | C-3 | C | A | A |
| Example 17 | D-2 | A-22 | — | C-3 | C | A | B |
| Example 18 | D-2 | A-23 | — | — | C | A | A |
| Example 19 | D-2 | A-24 | — | — | C | A | A |
| Example 20 | D-2 | A-25 | — | C-3 | C | A | B |
| Example 21 | D-2 | A-26 | | | C | A | B |
| Example 22 | D-2 | A-27 | | C-3 | C | A | A |
| Example 23 | D-2 | A-28 | | C-3 | C | A | A |
| Example 24 | D-2 | A-29 | | | C | B | A |
| Example 25 | D-2 | A-30 | | C-3 | C | A | B |
| Comparative Example 6 | D-2 | A-31 | — | C-3 | D | A | C |
| Comparative Example 7 | D-2 | A-32 | — | — | D | D | B |
| Comparative Example 8 | D-2 | A-33 | B-1 | C-3 | C | A | C |
| Comparative Example 9 | D-2 | A-34 | B-1 | C-3 | D | D | A |

In Examples having the configuration according to the present invention, a packaging material for a power storage device was provided which maintained a sufficient formability and had electrolytic resistance with which the packaging material is resistant to degradation caused by contact with the electrolyte.

REFERENCE SIGNS LIST 1,2 . . . Packaging material for a power storage device (Packaging material), 11 . . . Metal foil, 12 . . . Coating layer, 13 . . . Second corrosion protection layer, 14 . . . Sealant adhesive layer, 15 . . . Sealant layer, 16 . . . First corrosion protection layer

What is claimed is:

1. A packaging material for a power storage device, comprising:
    a coating layer disposed directly on a first surface of a metal foil or disposed via a first corrosion protection layer; and
    a second corrosion protection layer, a sealant adhesive layer, and a sealant layer disposed in this sequence on a second surface of the metal foil,
    wherein the coating layer is produced from an aromatic polyimide resin made of a tetracarboxylic dianhydride or derivatives thereof and a diamine or derivatives thereof, and
    wherein the coating layer has a tensile elongation in a tensile test (in compliance with JIS K7127, JIS K7127 specimen type 5, tensile rate 50 mm/min) is not less than 20% in an MD direction and a TD direction.

2. The packaging material for a power storage device of claim 1, wherein the aromatic polyimide resin contains at least one skeleton selected from the group consisting of a skeleton having aromatic rings bonded together via an ether group, ketone group, sulfonyl group or ester group, and a biphenyl skeleton.

3. The packaging material for a power storage device of claim 1, wherein the diamine or derivatives thereof are at least one selected from the group consisting of 1,3-bis(4-aminophenoxy) benzene, 1,4-bis(4-aminophenoxy) benzene, bis(4-(4-aminophenoxy)phenyl) ketone, bis(4-(4-aminophenoxy)phenyl) sulfone, bis(4-(4-aminophenoxy) phenyl) sulfide, 2,2-bis(4-(4-aminophenoxy)phenyl) propane and 4,4'-bis(4-aminophenoxy) biphenyl.

4. The packaging material for a power storage device of claim 1, wherein the coating layer is produced from the aromatic polyimide resin made of:
   an aromatic tetracarboxylic dianhydride having at least one binding group selected from the following group (A) or derivatives thereof and a diamine or derivatives thereof, or
   a diamine having at least one binding group selected from the following group (A) or derivatives thereof and an aromatic tetracarboxylic dianhydride or derivatives thereof:
      Group (A): the group consisting of ether group (—O—), sulfide group (—S—), ketone group (—CO—), ester group (—COO—) and sulfonyl group (—SO$_2$—).

5. The packaging material for a power storage device of claim 4, wherein the coating layer is produced from the aromatic polyimide resin made of:
   at least one aromatic tetracarboxylic dianhydride selected from the following group (B) and a diamine or derivatives thereof, or
   at least one diamine selected from the following group (C) or derivatives thereof and an aromatic tetracarboxylic dianhydride or derivatives thereof:
      wherein Group (B): the group consisting of 4,4'-oxidiphthalic acid anhydride, 3,3',4,4'-biphenyl tetracarboxylic dianhydride, 3,3',4,4'-diphenyl sulfone tetracarboxylic dianhydride and 3,3',4,4'-benzophenone tetracarboxylic dianhydride, and
      wherein Group (C): the group consisting of 4,4'-diaminodiphenyl ether, bis(4-aminophenyl) sulfoxide, bis(4-aminophenyl) sulfone, 2,2'-bis {4-(4-aminophenoxy) phenyl} propane, 4,4'-diaminobenzophenone and 3,3'-diaminobenzophenone.

6. The packaging material for a power storage device of claim 1, wherein at least one of the first corrosion protection layer and the second corrosion protection layer has a thickness in the range of 10 nm to 5 µm.

7. The packaging material for a power storage device of claim 6, wherein the first corrosion protection layer has a thickness in the range of 50 nm to 3 µm.

8. The packaging material for a power storage device of claim 1, wherein the coating layer has a thickness in the range of 3 to 30 µm.

9. A power storage device in which a power storage device element is sealed by the packaging material of claim 1.

* * * * *